Oct. 21, 1969  A. M. LOEB  3,473,371
DYNAMIC LOADING SYSTEM
Filed Aug. 8, 1966  3 Sheets-Sheet 1
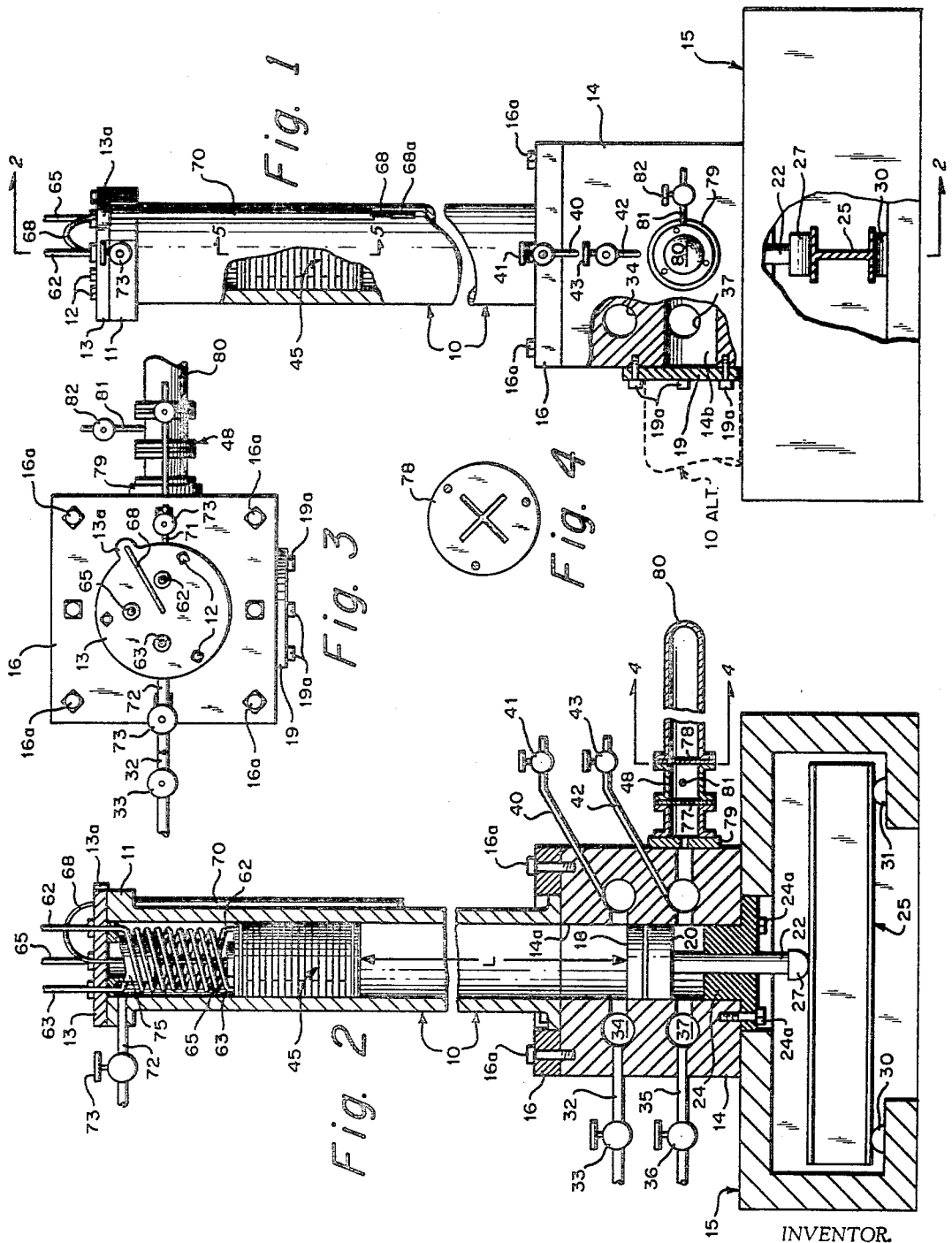
INVENTOR.
ALFRED M. LOEB
BY Meleson + Ratner
ATTORNEYS

INVENTOR.
ALFRED M. LOEB

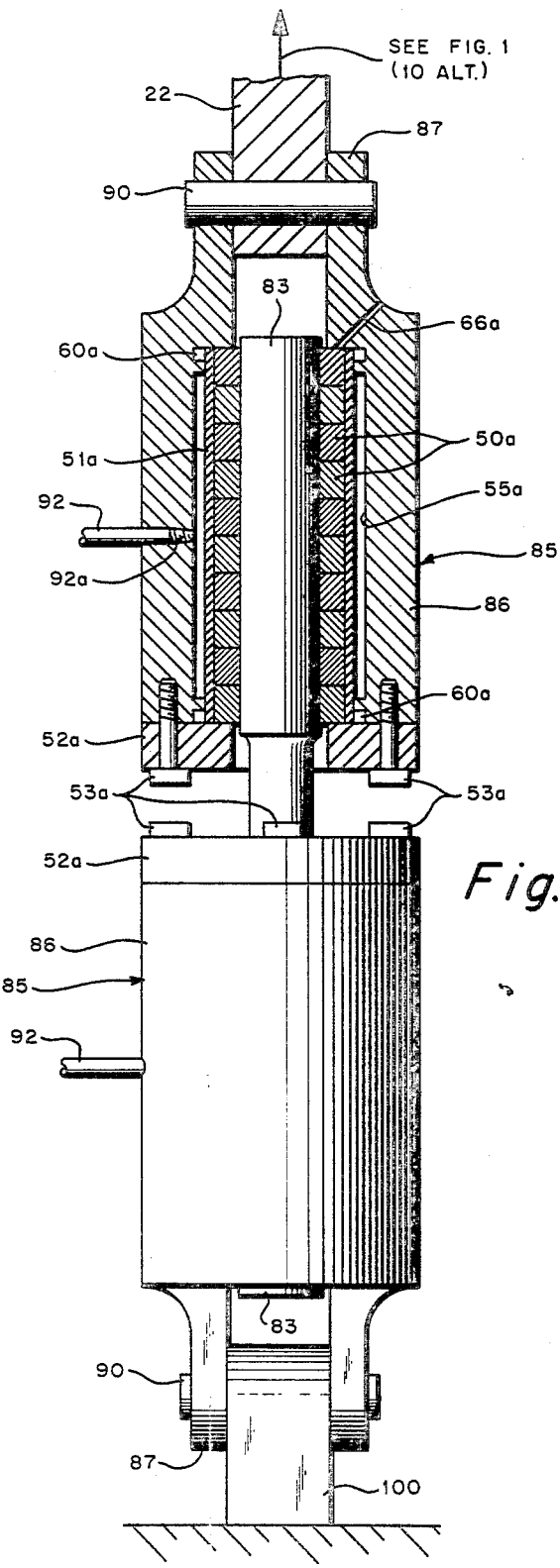

United States Patent Office 3,473,371
Patented Oct. 21, 1969

3,473,371
DYNAMIC LOADING SYSTEM
Alfred M. Loeb, Melrose Park, Pa., assignor to Weston Instruments, Inc., Newark, N.J., a corporation of Delaware
Filed Aug. 8, 1966, Ser. No. 570,800
Int. Cl. G01n 3/30
U.S. Cl. 73—91
10 Claims

ABSTRACT OF THE DISCLOSURE

A system and method for dynamically loading a specimen by producing a predetermined sudden force on the specimen without the loading system varying the characteristics of the specimen. A column of pressurized fluid of predetermined length is applied to one side of a driving member. Pressurized fluid is applied to another side of the driving member to apply substantially zero load to the specimen. The pressurized fluid is suddenly released so that the driving member is released suddenly to apply a dynamic load to the specimen. The length only of the fluid column is adjusted to provide a natural frequency of oscillation of the fluid column and the member which is substantially equal to the neutral oscillation frequency of the specimen.

---

This invention relates to a dynamic loading machine and more particularly to applying a dynamic load to a specimen in which the specimen responds as if the loader were massless.

Prior dynamic loading machines have been known to apply a dynamic load or pressure to a specimen under test in the form of tension, compression, or flexure. At the time of application of the dynamic load and during the application of the load, a dynamic excitation is produced in the specimen which is then detected and recorded. In some dynamic loading machines drop hammers have been utilized in which a hammer is dropped from a height to strike a specimen under test. In other dynamic loading machines oil or gas under pressure is used to actuate a piston to strike the specimen under test and to apply the dynamic load. During the application of such a dynamic load, the member driving the specimen strikes or produces an impact on the specimen. As a result of this contact the physical response characteristics of the specimen are changed due to the mass of the driving member. Specifically, the mass of the driving member is added to the mass of the specimen under test and the resultant mass becomes the effective mass of the specimen. The specimen may have a natural oscillation frequency of its own determined by its spring constant and mass. Upon application of the load, the frequency characteristics of the specimen may be changed by the mass of the driving member.

In addition, upon application of the load a substantially large magnitude force is produced on the specimen under test, as a result of the rapid load application time. This force decreases to a steady state value equal to the driving member weight or applied force. This large initial force which decreases is defined as "overshoot."

This force overshoot and change in characteristics of the specimen has been found to be undesirable for certain test applications. For example, a dynamic loading test may be used to simulate a specimen under the impact of a violent air blast. Since an air blast is substantially "massless" it has not heretofore been possible to simulate such a dynamic loading environment.

Accordingly, an object of the present invention is a system for dynamically loading a specimen in which the loading system does not vary the physical response characteristics of the specimen.

Another object of the present invention is a dynamic loading machine for simulating the impact of a violent air blast on a specimen under test which is relatively simple and versatile in operation.

In accordance with the present invention there is provided a dynamic loading system for producing a predetermined sudden force on a specimen under test in which the specimen has a predetermined natural frequency of oscillation. The loading system is tuned so that it has a natural frequency of oscillation substantially equal to the natural frequency of the specimen. In this manner upon application of the sudden force to the specimen the specimen reacts as though a sudden force were applied by a substantially massless loading system.

More particularly the loading system and the specimen under test oscillate in phase so that the force transmitted to the specimen is relatively constant during the time duration of application of the load. Therefore, since the force is substantially constant on the specimen there is relatively little overshoot.

Further in accordance with the invention, the dynamic loading system comprises a chamber with a load application member at least partially within the chamber consisting of a contacting member and a piston. The piston is in sliding, sealing fit within the inner walls of the chamber. The chamber has a first column extending away from a first side of the piston which defines one end of the first column. In addition the chamber has a second column extending away from the second side of the piston which defines one end of the second column. The other end of the second column has a sliding, sealing fit around the contacting member. Fluid is supplied under pressure to the first column to form a first fluid column therein until a static load is applied to the specimen. Fluid under pressure is then supplied to the second column until the static load is removed from the specimen. Thereafter the fluid is suddenly released from the second column so that a dynamic load is suddenly applied to the specimen. A slidable, grippable tuning slug is disposed within the first column to sealing adjust the length of the first column prior to fluid being supplied to the first column. The slug is hydraulically clamped to the chamber to provide a first fluid column length which together with the load application member has a natural frequency of oscillation during dynamic load substantially equal to the natural oscillation frequency of the specimen. In this manner, the loading system does not vary the physical response characteristics of the specimen under test.

Still further in accordance with the invention there is provided a device in slidable, grippable relation with a cylindrically shaped object and operable to securely grip the object. The device comprises an oil retaining member and a set of stacked split rings which define a cylinder. A continuous flexible sleeve is concentric with and adjacent to the cylinder with the sleeve touching the cylinder on only one side of the sleeve and on only one side of the cylinder. The member is sealed to the sleeve adjacent the ends of the sleeve but spaced away from the sleeve ends to define a recess. Fluid is supplied to the recess to flex the sleeve which presses the rings and changes the diameter of the cylinder thereby to clamp the rings to the object. In this manner there is provided a non-slip secure grip of the object.

For further objects and advantages of the invention and for typical embodiments thereof, reference is to be had to the following description taken in conjunction with the accompanying drawings in which:

FIGURE 1 is a side elevational view of a loading system embodying the invention;

FIGURE 2 is a sectional view of FIGURE 1 taken along lines 2—2;

FIGURE 3 is a plan view of a portion of FIGURE 1;

FIGURE 4 is an enlarged view of a rupture disc taken along lines 4—4 of FIGURE 2;

FIGURE 9 is a side view partially in section of tension grips used in another embodiment of the invention.

Figure 5:
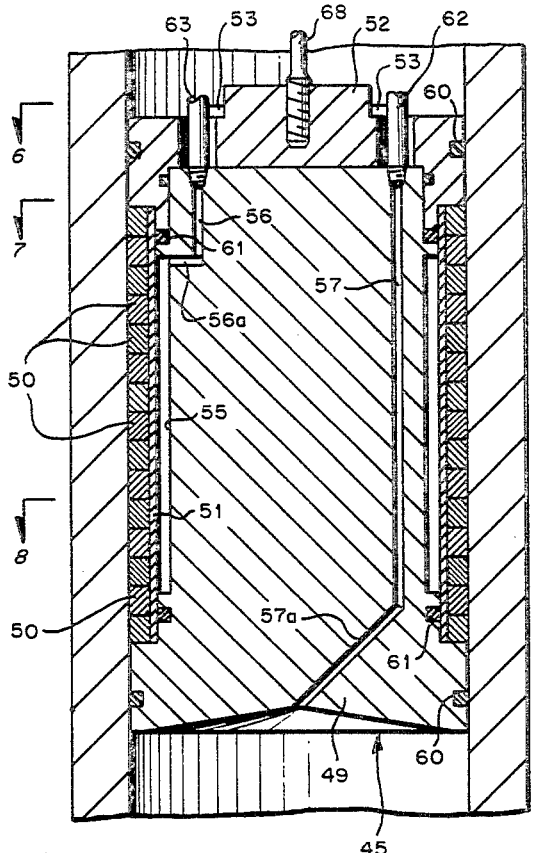
FIGURES 5–8 are enlarged views of the tuning slug utilized in FIGURES 1–3.

Referring now to FIGURES 1–3, there is shown a dynamic loading system having a hollow cylindrically shaped stack or tuning column 10. The upper end of stack 10 has an outwardly extending flange covered by a top flange secured in place by a plurality of bolts 12 which extend through openings in the top flange and threadedly engage the stack. The bottom of the stack has an outwardly extending flange which is secured by means of fastening bolts to an actuator body 14. Body 14 is carried by and fixed to a shaped supporting structure 15.

A vertically extending bore is formed in body 14 concentric with the vertical bore of stack 10. Disposed within the bore of actuator body 14 is a cylindrical piston 20 having an upper face 18 and a lower face 20. A piston rod 22 is formed concentric with and secured to the lower face 20 of the piston and extends through an opening in a bottom end cap 24. End cap 24 is secured to body 14 by an enlarged outer flange having openings through which a plurality of bolts 24a extend to threadedly engage the bottom surface of the actuator body. The end cap has a reduced section fitting within the actuator body and snugly received therein.

In the embodiment of the invention illustrated in FIGURES 1–3, the loading system applies flexural loading to a beam specimen 25 under test, and it will be understood that tension and compression loading may also be provided. In order to distribute the load transversely over the full width of the specimen, there is provided a load distributing member 27 formed of a solid half cylinder. The rectangular plane surface of member 27 at an intermediate point thereof is secured to the bottom flat surface of piston rod 22, as for example by bolts extending through the half cylinder and secured to the piston rod. The contact line of load distribution is established by the beam specimen 25 surface being tangent to the cylindrical surface of the load distribution member 27. Each end of specimen beam 25 is supported on its underside by a respective specimen end support 30 and 31 mounted on support structure 15.

Intermediate of the upper and lower surfaces of the actuator body are formed annular grooves 28 and 29 concentric with the actuator bore and of substantially greater diameter thereof. Grooves 28 and 29 are formed in position determined by the piston stroke. Flow passages connect with the annular grooves to provide for the ingress and egress of pressurized oil to the upper and lower surfaces of piston 17.

More particularly, a suitable upper column oil supply provides oil under pressure to a port in body 14 in fluid connection with the upper annular ring 28. An oil supply line 32 is coupled to that port having disposed therein a manual shut off valve 33. The other end of line 32 may be connected to a single source of oil supply or in a particular example (not shown), it may be coupled to a rapid fill supply at 400 p.s.i. and a high pressure supply at 10,000 p.s.i., each having a manual shut off valve. After rapid fill of the upper oil column, the rapid supply valve is closed and the high pressure valve is opened to allow high pressure oil to flow to the upper surface of piston 18.

Similarly, a suitable lower column oil supply provides oil under pressure to a port in body 14 in fluid connection with the lower annular ring 29. An oil supply line 35 is coupled to that port having disposed therein a manual shut off valve 36. The other end of line 35 may be connected to a single source of pressurized oil supply or to an interconnected rapid fill and high pressure supply as described above. In this manner, the lower oil column is oil filled.

In order to bleed air from the upper and lower oil columns there is provided a respective body port and conduit 40 and 42. To represent controlling the opening and closing of the conduits to vent air, there are shown valves 41 and 43 respectively disposed in the conduits. It will be understood that the air vents are disposed at the upper edge of the annular rings 28 and 29 to provide for proper bleeding of air. Air may be bled from the oil chambers by opening the respective valve until oil and not air exits. Instead of a conduit and valve arrangement, the port may, for example, terminate in a threaded seat to receive a manual bleed plug.

In order to change the length L of the oil column above the upper face 18 of piston 17, there is provided a tuning slug or clamp 45 which is positioned in the stack and secured thereto in a manner later to be described. With tuning slug 45 positioned, pressurized oil is supplied to the upper oil column until the desired static load is applied to the specimen under test. Specifically, pressurized oil is supplied to the upper oil column until the pressure of the oil in the upper oil column times the area of the upper piston surface equals to the desired static load on the specimen under test. The static load is of the same magnitude as the dynamic load, the application of which is described below.

After the upper oil column reaches its desired pressure, the upper oil supply is shut off and pressurized oil is supplied to the lower piston face area by way of the lower piston supply. The pressure in the lower oil column is increased until the static load is removed from the specimen and the specimen has thus returned to its zero deflection state. As the pressure in the lower oil column is increased and the static load is being removed from the specimen, the upper oil pressure increases to a magnitude greater than the pressure which produced the initial static load on the specimen. In this manner the oil in the upper oil column is further compressed to increase its pressure.

The dynamic loading system is ready to apply the dynamic load to the specimen. Such loading is produced by rapidly releasing the oil in the lower oil column by means of a rupture disc assembly 48 or other suitable release mechanism connected to and extending from body 14 and will later be described in detail. With lower oil column rapidly released by way of a fluid connection into the assembly, the oil under pressure in the upper oil column suddenly applies the desired dynamic load to the specimen. It will be understood by those skilled in the art that in theory if the dynamic load were applied to specimen 25 in zero magnitude time duration then the specimen would deflect twice that of its static deflection. However, the disc assembly may operate at times as short as one and one half milliseconds causing a dynamic deflection of a specimen equal to approximately 1.75 times of its static deflection.

In accordance with the invention such overshoot of the applied load is prevented by tuning the loading system so that its natural oscillation frequency is substantially equal to the oscillation frequency of the specimen. In this manner the characteristics of the specimen are not changed by the mass of the system driving the specimen comprising the piston, piston rod and the upper oil chamber. In addition, beat frequencies caused by the load varying between the piston rod and the specimen during the application of the load are prevented. By tuning of the dynamic loading system the specimen reacts as though a sudden force were applied to it by a substantially massless loading system.

More particularly, in order to tune the dynamic loading system the length L of the oil column between the lower surface of the slug and the upper surface of the piston is varied. The foregoing upper oil column, L, varies the natural oscillation frequency of the loading system for the following reasons.

The resonant frequency of the loading system having a driving system comprising the upper oil column and piston has a natural frequency defined by:

$$(1) \qquad w = \sqrt{\frac{\frac{AB}{L}}{\frac{Mo}{3} + Mp}}$$

where:

A = area of upper oil column
B = bulk modulus of oil
L = length of oil column
Mo = oil mass
Mp = piston mass Therefore, as the length L of the column is varied the oil mass, Mo, is also varied. Upon a predetermined change of the upper oil column the frequency may be adjusted to a desired value. This value is selected to be substantially equal to the natural oscillation frequency of the specimen beam 25 which, it will be understood, has a natural frequency defined by:

$$(2) \qquad w = \sqrt{\frac{K}{0.5Mb}}$$

K = spring constant
Mb = mass of beam having unclamped ends

Thus, in accordance with the invention by varying the length L, the frequency of the loading system may be adjusted to be substantially equal to the natural frequency of the specimen under test. It will be understood that during the dynamic loading, the length L will vary as the piston oscillates. However, this oscillation distance is substantially small as compared with the total length L. It will also be understood that in the foregoing description, it has been assumed that the rise time of the application of the load is of substantially short time duration as compared with the period of oscillation of the specimen. As a result it is possible to tune the loading system to a frequency substantially equal to the natural frequency of the specimen.

However, if the rise time of the application of the load is of substantially long time duration as compared with the period of oscillation of the specimen, tuning is not required since the specimen responds substantially as a static load. The latter will normally occur for tests of compression and tension which may be provided by the dynamic loading machine of the present invention in a manner later to be described.

Figure 6:
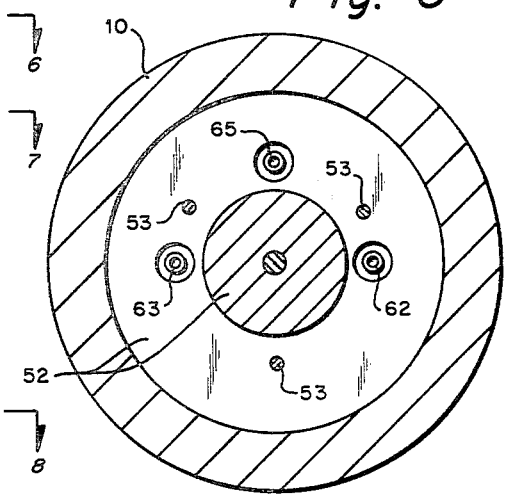
Figure 7:
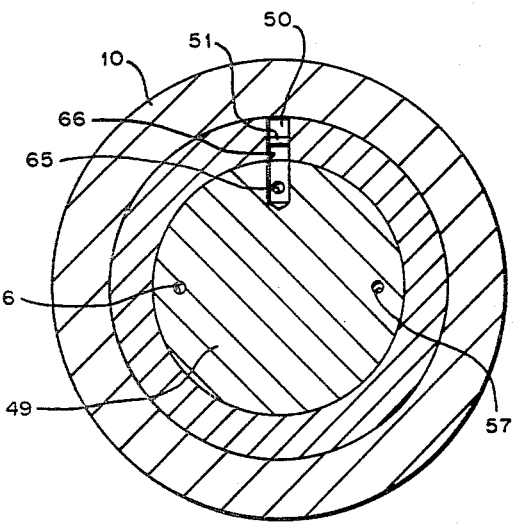
Figure 8:
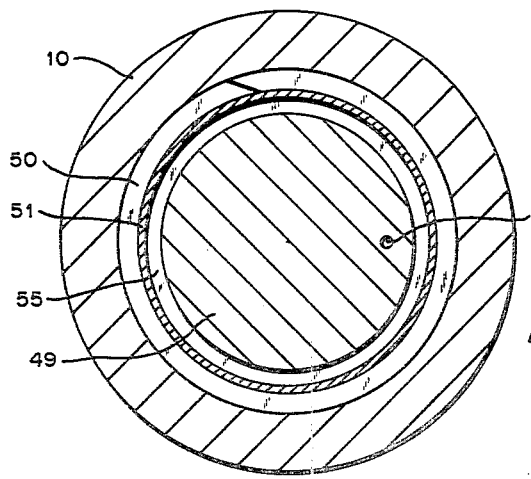

Referring now to FIGURES 5–8, there is shown in more detail tuning slug 45 which comprises a solid aluminum cylinder 49, an expansion sleeve 51 and split rings 50. Expansion sleeve 51 is a thin-walled hollow aluminum cylinder open at both ends and having a thickness substantially equal to 1/16 of an inch. A cylindrical end cap 52 is secured by means of screws 53 to the upper end of aluminum cylinder 49 having an outer diameter substantially equal to the inner diameter of the stack 10. Similarly, the lower end portion of the aluminum cylinder has an outer diameter substantially equal to the stack inner diameter. Between the upper and lower end portions of the aluminum cylinder, the circumference is under cut to a depth equal to that of the width of split rings 50 plus the thickness of expansion sleeve 51.

More particularly, expansion sleeve 51 is slipped over the solid aluminum cylinder 49 with the end cap 52 removed and the split rings 50 are disposed about the expansion sleeve. In this manner the outer diameter of the resultant structure is substantially constant over its entire length. In addition there is a further undercut 55 on the circumference of the solid aluminum cylinder below a major portion of the expansion sleeve to allow approximately 1/16 of an inch between cylinder 49 and sleeve 51 to provide for the introduction of pressurized oil. Disposed adjacent each of the upper and lower ends of the sleeve and within grooves formed in the aluminum cylinder are O rings 61 to contain the high pressure oil provided in undercut cavity 55. Oil is introduced through a tapped opening in the upper end of the aluminum cylinder and through a longitudinal port 56 drilled in the aluminum cylinder which communicates with a transverse port 56a entering into the undercut cavity. In addition, in order to seal the upper and lower end of the aluminum cylinder there are provided upper and lower grooves respectively having disposed therein rubber O rings 60.

To clamp slug 45 within stack 10, pressurized oil is introduced into the undercut cavity 55 by way of ports 56 and 56a causing sleeve 51 to expand over its entire length. In this manner split rings 50 are squeezed by the sleeve against the inner diameter of the stack clamping the rings to the stack so that the rings become an integral part of the stack wall and do not slip on the wall. The pressure of the oil times the internal area of the sleeve exerts a normal force against the stack. The magnitude of this normal force times the coefficient of friction of the two materials is equal to the holding force of the tuning slug. This holding force acts against the oil pressure on the lower surface of solid cylinder 49 times the area of that lower surface. It will be understood that the pressure acting against the lower surface of cylinder 49 is the same pressure that acts against the upper face 18 of the piston as previously described.

The purpose of split rings 50 is to withstand the end load caused by the oil pressure on the lower surface of the cylinder. Specifically, the foregoing pressure causes a bearing stress between the cross-sectional area of the lowermost split ring 50, and the upper surface 59 of the undercut lower portion of cylinder 49. The split rings are of suitable thickness to withstand such bearing stress which could not be withstood by the thin walled sleeve. It will now be understood that the bearing reaction is the result of the upper oil column pressure tending to drive slug 45 toward the top of the stack with the outer split rings hydraulically clamped to the stack. Thus a "non-slip" tuning slug is provided to adjust the length of the column.

In order to provide slug 45 with high pressure oil an air bleed and an oil bleed, there are provided three coiled tubes 62, 63 and 65 wound in a spring-like fashion between end flange 13 and upper end cap 52 of the slug. Specifically, a first of the tubes 63 may engage a fitting received within a tapped hole leading to ports 56 and 56a. A second of the tubes 62 may engage a fitting received within a tapped hole leading to a longitudinal port 57 drilled approximately two-thirds from the upper end of the aluminum cylinder and connecting to an opening 57a leading to the center of the lower surface of the cylinder. The lower surface of the cylinder may be cone shaped to cause any trapped air in the upper oil column to converge toward the opening and therefore be led through ports 57a and 57 to tube 62. The third tube 65 may engage a fitting received within a tapped hole leading to a port 66 normal to the axis of cylinder 49 and adjacent the upper end thereof. Port 66 is effective to bleed out oil trapped between the upper and lower O rings.

The three tubes 62, 63 and 65 are connected to corresponding fittings which extend through respective openings in flange 13. The fittings are connected to respective pressurized oil supply and bleed lines.

In order to indicate the position of the slug within the stack or chamber 10, there is provided an indicator rod 68 about eighteen inches long having a wire connected to the end thereof which extends through an axial opening in the flange. The wire extends through a capillary tube 70 which is brought around flange 11 and downwardly through an indicator tube with the end of the wire weighted. The indicator tube has a longitudinal slot so that the position of the weight may be seen thereby to indicate the position of tuning slug 45.

In order to position the slug in the stack, oil under pressure is introduced above the slug from an oil supply by way of a port and oil line 72 having a valve 73 disposed therein. It will be recalled that oil under pressure is supplied to the upper oil column below slug 45 by line 32. Accordingly, the slug may be positioned by adjusting the difference in pressure between the upper slug pressure and the lower slug pressure (upper oil column) until a balance of pressure is achieved at a desired slug position. At that time pressurized oil may be supplied by way of tube 63 to lock the tuning slug in place to sealingly adjust the length of the upper oil column in the manner previously described. In order to prevent the slug from crushing tubes 62, 63 and 65, there is provided a mechanical stop 75 of hollow cylindrical shape having an outer diameter less than that of the inner diameter of stack or chamber 10 with the upper end of the stack secured to the underside of end flange 13.

Referring again to FIGURES 1–3, the oil release system for the lower oil column comprises an orifice plate 79 secured to an opening in body 14. Plate 79 has an opening matched to a desired rise time for the application of the load to the specimen. The opening in plate 79 leads to a rupture disc assembly enclosed in a housing and comprising a pair of rupture discs 77 and 78 concentric with the orifice in plate 79. Each of the rupture discs 77 and 78 comprises a thin circular disc having an X scored across a face as shown in FIGURE 4. This scoring causes the disc to burst at a predetermined pressure. For example, the discs may be designed to rupture at a pressure equal to 60 percent of the pressure in the lower oil column. By pressurizing the space between the two discs 77 and 78, as for example by an external supply connected between the discs, to 50 percent of the pressure of the lower oil column, neither of the discs ruptures. In this manner the oil pressure is contained in the lower oil column. When it is desired to release the pressure in the lower oil column, valve 82 is opened which is disposed in line 81 connected between the lower oil column and the rupture disc interface. In this manner the second or right hand disc 78 ruptures as substantially 100 percent of the pressure of the lower oil column is applied across that disc. When the second disc ruptures then approximately 100 percent of the lower oil pressure is applied across the first disc 77 and the first disc ruptures. Accordingly, both discs rupture and the oil pressure is dumped through the orifice of plate 79 and through the ruptured discs into an enclosed oil reservoir 80. Thus the lower oil pressure is suddenly decreased and the dynamic load is applied by the upper oil column. After the test, the rupture disc assembly may be removed by means of suitable bolts coupling plate 79 to actuator body 14, new discs inserted and the oil removed from the oil reservoir.

In accordance with standard hydraulic practice, oil seals are utilized where necessary under the high oil pressures used in the dynamic loading system wherever leakage would be detrimental to operation. Specifically, oil seals may be provided around the piston rod 22, rupture discs 77 and 78, the stack flanges, the lower end cap, etc. In addition, the fastening bolts may be "preloaded" so that the forces which would tend to separate bolted surfaces are less than the total holding force of the bolt. For example, bolts 12 securing end cap 11 in place are tightened so that their holding force is greater than the maximum force applied to the upper surface of the end cap. The differing parts of the dynamic loading system are constructed of a suitable metal such as steel.

There has now been described the manner in which the load application member comprising piston 17, rod 22 and member 27 flex the specimen. It will also be seen that compression may be applied to a specimen by placing a specimen between the contacting member rod 22 and member 27 and a support structure such as a pedestal. More particularly, a pedestal (not shown) is disposed directly beneath piston rod 22 and reacts against a rigid base such as a concrete floor so that the contacting member compresses the specimen between the member and the pedestal.

In addition, a tension test may also be provided on a specimen 83 as shown in FIGURE 9. Specifically, one end of specimen 83 is rigidly secured within a lower power tension grip 85 coupled to a fixed surface. The other end of the specimen is rigidly secured within an upper tension grip 85 connected to the piston rod. Pressurized oil is first supplied to the lower oil chamber and then pressurized oil is supplied to the upper oil chamber, in manner similar to that previously described. The pressure difference between the upper and lower columns may be at a maximum of ten percent of the desired load on the specimen. Thus when the upper oil column pressure is rapidly decreased, the lower oil column pressure is effective to apply a dynamic tension load to the specimen. In order to provide the lower oil column with a length L of oil stack, stack 10 may be disconnected from its illustrated position and connected to an opening in the actuator body. The opening then left by the stack is closed off by a blanking flange.

Upper tension grip 85 comprises a housing or body 86 having a cylindrically shaped inner chamber and having an upper portion formed into a clevis 87. The clevis portion 87 of body 86 is pivotally connected by way of member 90 to the lower end of piston rod 22, FIGURES 1–3. Except for the manner in which the upper and lower tension grips 85 are secured to piston 22 and a fixed surface respectively, both of the grips are identical in construction and only one of them, the upper grip, will be described in detail.

Device 85 provides a non-slip grip of specimen 83 within the inner chamber of body 86. This clamping action is similar to that of slug 45 which clamps itself to stack 10 with the split rings thereof becoming an integral part of the stack wall. Accordingly, corresponding elements of grip 85 have been identified by the same reference character as that of slug 45 plus a suffix. Specifically, grip 85 comprises an expansion sleeve 51a and split rings 50a. A washer shaped end cap 52a is provided open in the center to admit the specimen 83 and is secured to the lower end of body 86 by means of bolts 53a. The diameter of the opening of end cap 52a is substantially equal to the inner diameter of split rings 50a thereby to accommodate the end load caused by the tensioning of specimen 83.

The inner chamber or wall of body 86 is under-cut substantially equal to that of the width of the split rings 50a plus the thickness of the expansion sleeve 51a to provide an upper stop for split rings 50a.

The expansion sleeve 51a is slipped within the inner wall of body 86 with the end cap 52a removed and the split rings 50a are disposed within sleeve 51a. In this manner the inner diameter of the resultant structure is substantially constant. In addition, there is further under-cut in the inner wall of body 86 a cavity 55a over a major portion of the expansion sleeve 51a to allow approximately one-sixteenth of an inch between the inner wall and the sleeve to provide for the introduction of pressurized oil. Oil is introduced through tapped oil port 92 formed transversely of body 86 and intermediate of the ends of sleeve 51a; port 92 forms a fluid connection between an oil supply and the under-cut cavity 55a. In order to bleed out oil trapped in the upper portion of the split rings 50a, there is provided an upper oil drain port 95 formed in body 86 terminating in a seat to receive a plug 95a. Similarly, there is provided in end cap 52a a transverse opening forming an oil drain port 96 for the lower portion of the split rings 50a. Port 96 terminates in a seat to receive a plug 96a.

As previously described with respect to slug 45, the purpose of split rings 50a is to withstand the end load which causes a bearing stress between the cross sectional area of the lowermost split ring 50a and the upper surface of end cap 52a engaging ring 50a. The split rings are of sufficient thickness to withstand such bearing stress which could not be withstood by sleeve 51a. In operation, pressurized oil is introduced into the undercut cavity 55a causing sleeve 51a to expand over its entire length. In this manner split rings 50a are squeezed together by the sleeve against the outer diameter of specimen 83 clamping the specimen so that the rings become an integral part of the specimen. In this manner there is provided a non-slip grip having a substantially high gripping force.

Piston 17, piston rod 22 and member 27 may be called a load application member comprising a contacting member (rod 22 and member 27) and a piston 17. Slug 45 may be called an adjustable, slideable and lockable clamp having a sealing fit within the inner walls of a chamber 10.

Now that the principles of the invention have been explained it will be understood that many modifications may be made all within the scope of the appended claims.

What is claimed is:

1. A dynamic loading system for producing a predetermined sudden force on a driven member without said loading system varying the characteristics of said driven member, said driven member having a predetermined natural frequency of oscillation comprising,
a load application driving member,
fluid column means for applying pressurized fluid in a column of predetermined length to one side of said driving member,
means for applying pressurized fluid to another side of said driving member to apply substantially zero load to said driven member,
means to suddenly release said pressurized fluid from said other side of said driving member to suddenly release said driving member for applying a dynamic load to said driven member and
means to adjust the length only of said column for tuning the natural frequency of said loading system to said natural frequency of said driven member whereby during dynamic load said driven member reacts as though a sudden force were applied by a substantially massless loading system.

2. A system for dynamically loading a specimen in which said loading system does not vary the physical response characteristics of said specimen comprising
a chamber having inner walls,
a load application member at least partially within said chamber comprising a contacting member affixed to a piston, said piston having a sliding, sealing fit within the inner walls of said chamber,
said chamber having a first column extending away from a first side of said piston which defines one end of said first column,
said chamber having a second column extending away from a second side of said piston which defines one end of said second column, the other end of said second column, the other end of said second column having a sliding sealing fit around said contacting member,
first means to supply fluid under pressure to said first column to form a fluid column therein until a desired static load is applied to said specimen,
second means to supply fluid under pressure to said second column until the static load is removed from said specimen,
means to suddenly release fluid from said second column whereby a dynamic load is suddenly applied to said specimen,
means to sealingly adjust the length of said first column prior to fluid being supplied to said first column to provide a first fluid column which together with said load application member have a natural frequency of oscillation during dynamic load substantially equal to the natural oscillation frequency of said specimen.

3. The system of claim 2 in which said chamber comprises (1) a stack having a cylindrically shaped chamber closed at one end and (2) a body having an inner bore, the other end of said stack being secured to said body and in fluid connection with said bore, and said piston being disposed within said bore.

4. The system of claim 3 in which said length adjusting means comprises a tuning slug disposed within said stack and includes a housing, an expansion sleeve disposed about said housing and split rings disposed about said sleeve, a cavity being defined between said housing and said sleeve and between the ends of said sleeve, means to admit fluid to said cavity to expand said sleeve which squeezes the said split rings against the wall of said stack chamber whereby said rings become an integral part of said stack wall thereby clamping said slug to said stack.

5. The system of claim 2 in which said length adjusting means comprises a tuning slug disposed within said chamber at a desired position therein, and means for hydraulically clamping said slug at said desired position.

6. The system of claim 4 in which said release fluid means comprises a rupture disc assembly in fluid communication with said second column and including at least one rupture disc between said second fluid column and a fluid reservoir.

7. A testing machine to dynamically load a specimen to be tested in which said testing machine does not vary the physical response characteristics of said specimen, comprising:
a chamber, a load application member at least partially within said chamber, said load application member comprising a contacting member and a piston,
said chamber having a first section and a second section, said piston having a first side and a second side, said contacting member extending from and affixed to said second side of said piston,
said piston having a sliding sealing fit against inner walls of said chamber,
said second side of said piston defining one end of said second section, the other end of said second section having a sliding sealing fit around said contacting member,
said first section of said chamber extending from said first side of said piston, said first side of said piston defining one end of said first section, the other end of said first section being defined by a selectively adjustable, slideable and lockable clamp having a sealing fit within said inner walls of said chamber,
means to admit fluid to said first section to apply a static load to said member, means to admit fluid to said second section until the static load is removed from said specimen,
means to suddenly release said fluid from said second section whereby a dynamic load is suddenly applied to said specimen in which the oscillation frequency of the fluid in said first section and said load application member is substantially equal to the oscillation frequency of said specimen.

8. The testing machine of claim 7 in which said clamp comprises a tuning slug disposed within said first section at a desired position therein, and means for hydraulically clamping said slug at said desired position.

9. The testing machine of claim 7 in which said clamp comprises a tuning slug disposed within said first section and includes a solid cylinder, a flexible sleeve open at both ends and fitted about said cylinder and split rings fitted about said sleeve, a recess defined between said sleeve and said cylinder and between the ends of said sleeve, means to admit fluid to said recess to flex said sleeve which presses said rings against the inner walls of said first section thereby clamping said tuning slug in position.

10. The system of claim 7 in which said sudden release means comprises a rupture disc assembly on fluid communication with said second section and including a plurality of rupture discs coupled between said second section and a fluid reservoir.

References Cited

UNITED STATES PATENTS

| | | | |
|---|---|---|---|
| 2,530,483 | 11/1950 | Russenberger | 73—92 |
| 2,576,433 | 11/1951 | Wood | 73—97 X |
| 2,886,965 | 5/1957 | Kugler | 73—67.3 X |
| 3,077,190 | 10/1962 | Minke | 73—12 X |
| 3,388,092 | 8/1967 | Lindholm et al. | 73—97 X |

RICHARD C. QUEISSER, Primary Examiner

JERRY W. MYRACLE, Assistant Examiner

U.S. Cl. X.R.

73—12

Disclaimer and Dedication 3,473,371.—*Alfred M. Loeb*, Melrose Park, Pa. DYNAMIC LOADING SYSTEM. Patent dated Oct. 21, 1969. Disclaimer and dedication filed Feb. 4, 1970, by the assignee, *Weston Instruments, Inc.*

Hereby enters this disclaimer to the entire remaining term of the said patent and dedicates the patent to the Public.

[*Official Gazette June 2, 1970.*]